July 17, 1923.
G. M. GROSS
STERILIZING CONTAINER
Filed March 24, 1922
1,462,334
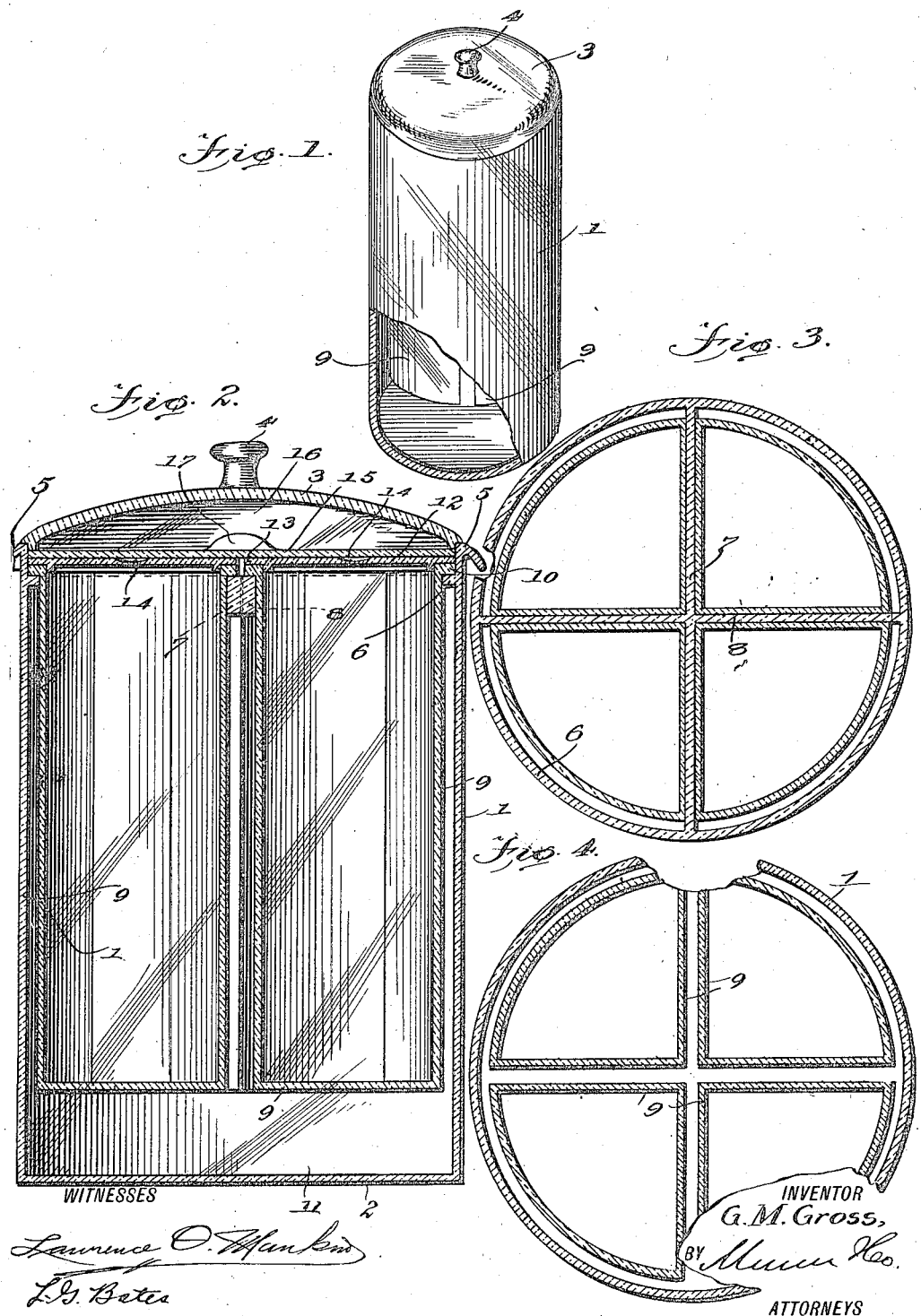
INVENTOR
G. M. Gross,
ATTORNEYS Patented July 17, 1923.

1,462,334

UNITED STATES PATENT OFFICE.

GILBERT MENDENHALL GROSS, OF ELDORADO SPRINGS, MISSOURI.

STERILIZING CONTAINER.

Application filed March 24, 1922. Serial No. 546,388.

*To all whom it may concern:*

Be it known that I, GILBERT M. GROSS, a citizen of the United States, and resident of Eldorado Springs, in the county of Cedar and State of Missouri, have invented certain new and useful Improvements in Sterilizing Containers, of which the following is a specification.

My invention relates generally to containers, and more particularly to a container which is adapted to be used in laboratories, hospitals and like places to receive instruments to be sterilized or to hold instruments in a sterilized condition, and it consists in the combinations, constructions and arrangements herein described and claimed.

An object of my invention is to provide a container having a plurality of compartments, each separate and distinct from the other compartments, and each being adapted to permit of instruments to be sterilized or kept in a sterilized condition being removably disposed therein.

A further object of my invention is to provide a container which comprises an outer casing and a plurality of cells arranged within the outer casing in spaced relation thereto and in respect to one another, the cells being removable from the outer casing at will for cleaning or other purposes.

Other objects and advantages will be apparent from the following description and the novel features of the invention will be particularly outlined in the appended claims.

My invention is illustrated in the accompanying drawings, forming a part of this application, in which Figure 1 is a perspective view of a practical embodiment of the invention, portions thereof being broken away, Figure 2 is an enlarged vertical sectional view through the container, and Figures 3 and 4 respectively, are horizontal sections on different planes through the container, portions of the structure exhibited in Figure 4 being broken away.

In carrying out my invention, I provide a container casing 1 which is preferably cylindrical in conformation and is made of any suitable material, preferably glass. The container casing 1 includes a bottom 2 which is an integral part thereof. An arched or convexo-concaved lid 3 fits upon the container casing 1 at the upper end thereof in such manner as to have a fluid tight fit therewith and to be removable at will. A knob or handle 4 may be attached to the lid 3 centrally thereof for convenience in removing or replacing the lid. The container casing 1 preferably has a pair of diametrically opposed outwardly extending ears 5—5 which provide hand holds when it is desired to move the container.

An inwardly extending continuous rib 6 lying in a plane parallel to the bottom 2 is formed on the inner wall of the container casing at a determined distance from the upper end thereof. Diametrically disposed cross members 7 and 8 respectively are provided at the upper end of the container casing in such position that the plane of the upper side of each coincides with the plane of the upper side of the other cross member and with the plane of the upper side of the rib 6. In the embodiment of the invention illustrated, the rib 6 and the diametrically disposed cross members 7 and 8 are formed integrally with one another and with the walls of the container casing 1, all being made of glass. The cross members 7 and 8 intersect each other intermediately substantially at right angles so that the portions of the rib 6 subtended by adjacent radial arms or portions of the cross members are equal and respectively cooperate with the subtending radial portions to provide suspension frames, each of which has the form of a quadrant.

Each suspension frame supports a cell 9 through the agency of an outwardly extending continuous flange 10 formed upon the latter at the upper end thereof and adapted to rest upon adjacent radial portions of the intersecting cross members 7 and 8 and the subtended portion of the annular rib 6 when the body of the cell has been lowered into the position in which illustrated in Figure 2. It is also to be observed at this point that the height of the cell 9 is considerably less than that of the container casing 1, whereby a space 11 is provided between the lower ends of the cells and the bottom 2 when the cells are supported by the suspension frames to depend within the container casing, as best seen in Figure 2. The several cells are likewise spaced from the inner wall of the sides of the container casing by the ribs 6 and each cell is spaced from every other cell a distance equal to the thickness of the cross members 7 and 8.

The cells 9 are preferably made of glass and are sector-shaped in cross section. Each cell has integrally formed bottom and side walls and is closed at its upper end by a removable closure 12 having a marginal flange portion 13 adapted to overlie the side walls of the cell at the upper end thereof to preclude the possibility of the closure being accidentally dropped into the cell when removed therefrom or placed thereon. The closure 12 for each cell has a fluid tight fit therewith and is provided with a hand hold 14 on the upper side thereof to permit of the convenient removal of each closure. A closure 15 common to all the cells 9 is adapted to interfit the container casing 1 to lie in superimposed relation to the several closures 12. The closure 15 is substantially flat and an air space 16 is thus defined between the closure 15 and the lid 3. A lug 17 may be provided upon the closure 15 in position to be conveniently grasped to effect the removal of the closure from the container casing or the replacement of the closure in the container casing.

From the foregoing description of the various parts of the device, the operation thereof may be readily understood. Each cell 9 is adapted to hold a liquid or any other fluid which it is desired to use in sterilizing instruments, in keeping sterilized instruments or the like in an uncontaminated condition or in like operations. Each cell is separate and distinct from every other cell comprised in the device and is provided with a separate fluid tight closure or lid. It will be obvious that articles may be placed within or removed from any cell selected without in any way disturbing the contents of the remaining cells.

If desired, the container casing 1 and the lid therefor may be painted or treated in any other suitable known manner to retard or prevent the passage of rays of light through the walls thereof.

An important advantage of the invention is derived from the construction of the container which permits of the removal of the cells from the container casing for the purpose of cleaning the cells or the interior of the container casing, or for any other reason.

Obviously, my invention is susceptible of embodiment in forms other than that in which it is illustrated in the accompanying drawings, and I therefore consider as my own all modifications and adaptations of the form of the device disclosed herein which fairly fall within the scope of the appended claims.

Having thus described the invention what I claim is:—

1. In combination, a container casing consisting of a cylindrical body closed at its lower end and an arched removable lid for the upper end thereof, a plurality of cells adapted to lie in juxtaposed spaced relation within the container casing, means within the container casing for removably supporting the cells within the casing in spaced relation to one another and to the bottom and side walls of the container casing, a removable closure for the upper end of each cell, and a closure fitting within the container casing at the upper end thereof to rest upon the closures of the said cells.

2. In a device of the character described, a container casing having a closed lower end and an open upper end, a plurality of cells adapted to lie in juxtaposed spaced relation within the container casing, means within the container casing for removably supporting the cells within the casing, a removable closure for the upper end of each cell, and a closure fitting within the container casing at the upper end thereof to rest upon the closures of the said cells.

GILBERT MENDENHALL GROSS.